United States Patent [19]

Lubowitz et al.

[11] Patent Number: 5,071,941

[45] Date of Patent: Dec. 10, 1991

[54] MULTIDIMENSIONAL ETHER SULFONE OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 329,244

[22] Filed: Mar. 6, 1989

Related U.S. Application Data

[60] Continuation-in-part of Ser. No. 816,489, Jan. 6, 1986, Pat. No. 4,739,030, which is a division of Ser. No. 704,475, Feb. 22, 1985, abandoned, which is a division of Ser. No. 505,348, Jun. 17, 1983, Pat. No. 4,536,559.

[51] Int. Cl.$^5$ .................. C08G 73/00; C08G 75/00
[52] U.S. Cl. .................................. 528/170; 528/171; 428/288; 428/290; 427/350; 427/385.5; 548/435; 548/476; 548/547
[58] Field of Search ............................ 528/171, 170

[56] References Cited

U.S. PATENT DOCUMENTS

| | | | |
|---|---|---|---|
| 4,851,501 | 7/1989 | Lubowitz et al. | 528/170 |
| 4,871,475 | 10/1989 | Lubowitz et al. | 528/170 |
| 4,973,662 | 11/1990 | Odagire et al. | 528/170 |

*Primary Examiner*—Harold D. Anderson
*Assistant Examiner*—T. Mosley
*Attorney, Agent, or Firm*—John C. Hammar

[57] ABSTRACT

The solvent resistance of polyethersulfone oligomers is enhanced by using difunctional imidophenol end-cap monomers to provide improved crosslinking. The imidophenol monomers include two unsaturated functionalities capable of cross-linking upon thermal or chemical activation. Blends, pregregs, and composites using the novel end caps are described for linear or multidimensional polyethersulfone oligomers.

16 Claims, No Drawings

MULTIDIMENSIONAL ETHER SULFONE OLIGOMERS

REFERENCE TO RELATED APPLICATIONS

This application is a continuation-in-part and divisional application based upon U.S. application Ser. No. 816,489 filed Jan. 6, 1986, U.S. Pat. No. 4,739,030 which was a continuation-in-part application based upon U.S. application Ser. No. 704,475, filed Feb. 22, 1985, now abandoned, which was a divisional application based upon U.S. application Ser. No. 505,348, filed June 17, 1983, now U.S. Pat. No. 4,536,559.

TECHNICAL FIELD

The present invention relates to multidimensional oligomers and to prepregs, composites, or blends of polysulfone or polyethersulfone oligomers that are capped with difunctional, crosslinking end-cap monomers. Blends include the oligomers and compatible noncrosslinking polymers.

BACKGROUND ART

Although thermoplastic resins and their applications are well known, reinforced resins are relatively new and have significant advantages over pure, resinous composites. Fiber reinforcement toughens and stiffens the resin to produce high performance products. At the same time, processing is not seriously hindered because the reinforced resin maintains its thermoplastic character. For example, a sheet of fiber reinforced resin can be heated, stamped into a desired shape by appropriate dies, reheated and restamped to alter the shape. In contrast, a thermosetting resin cannot be reshaped, once it is fully cured by heating. Thermoplastic resins, however, generally exhibit poor solvent resistance, and this deficiency has severely limited their use. For example, reinforced thermoplastic resin circuit boards of conventional design cannot be cleaned by solvents commonly used in the manufacture of circuit boards. Hydraulic fluids and cleaning fluids in aircraft limit adoption of conventional thermoplastic resins unless their solvent resistance can be improved.

Recently, chemists have sought to synthesize oligomers for high performance advanced composites suitable for aerospace applications. These composites should exhibit solvent resistance, be tough, impact resistant, and strong, be easy to process, and be thermoplastic. Oligomers and composites that have thermo-oxidative stability, and, accordingly can be used at elevated temperatures, are particularly desirable.

While epoxy-based composites are suitable for many applications, their brittle nature and susceptibility to degradation make them inadequate for many aerospace applications, especially those applications which require thermally stable, tough composites. Accordingly, research has recently focused upon polyimide composites to achieve an acceptable balance between thermal stability, solvent resistance, and toughness. The maximum use temperatures of conventional polyimide composites, such as PMR-15, are still only about 600°–625° F., since they have glass transition temperatures of about 690° F.

Linear polysulfone, polyether sulfone, polyester, and polyamide systems are also known, but each of these systems fails to provide as high thermal stability as is required in some aerospace applications.

There has been a progression of polyimide sulfone compounds synthesized to provide unique properties or combinations of properties. For example, Kwiatkowski and Brode synthesized maleic-capped, linear polyarylimides as disclosed in U.S. Pat. No. 3,839,287. Holub and Evans synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or 4,536,559, and have continued to make advances with polyetherimidesulfones, polybenzoxazolesulfones (i.e., heterocycles), polybutadienesulfones, and "star" or "star-burst" multidimensional oligomers. We have shown surprisingly high glass transition temperatures and desirable physical properties in many of these oligomers and their composites, without losing ease of processing.

Multidimensional oligomers, such as disclosed in our copending application U.S. application Ser. Nos. 726,258; 810,817; and 000,605, are easier to process than many other advanced composite oligomers since they can be handled at lower temperatures. Upon curing, however, the unsaturated phenylimide end caps crosslink so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are unsatisfactory, also, since the resins often are semicrystalline which makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, endcapped polyester imide ether sulfone oligomers that have an acceptable combination of solvent resistance, toughness, impact resistance, strength, ease of processing, formability, and thermal resistance. By including Schiff base (—CH=N—), imidazole, thiazole, or oxazole linkages in the oligomer chain, the linear, advanced composites formed with polyester oligomers of our copending application U.S. application Ser. No. 726,259 can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties (over a broad range of temperatures), and (7) high temperature resistance that is desirable on aerospace advanced composites. These prior art composites are often too brittle.

Thermally stable multidimensional oligomers having semiconductive or conductive properties when doped with suitable dopants are also known and are described in our copending applications (including U.S. application Ser. No. 773,381 to Lubowitz, Sheppard, and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e., a radical having one or two crosslinking sites) to allow controlled crosslinking upon heat-induced or chemically-induced curing.

Polyamides of this same general type are described in our copending patent application U.S. application Ser. No. 061,938; polyetherimides, in U.S. application Ser. No. 016,703; and polyamideimides, in U.S. application Ser. No. 092,740.

SUMMARY OF THE INVENTION

Our U.S. Pat. No. 4,536,559 discloses and claims a series of thermoplastic polyethersulfone resins that resist attack by organic solvents because they include novel, difunctional end-cap monomers to provide crosslinking. These resins have aromatic backbones for thermal stability and are resistant to solvents conventionally used in aerospace applications, such as MEK and methylene chloride. The oligomers can be crosslinked by thermal and/or chemical activation through the difunctional end-cap monomers. The present invention relates to prepregs, composites, and blends of the oligomers.

The oligomers are generally prepared by reacting:
1) 2 moles A—OH,
2) (n+1) moles X—R—X (a dihalogen), and
3) n moles HO—R'—OH (a bisphenol),
wherein A is

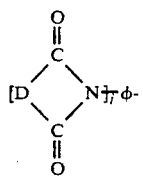

$\phi$ = phenyl;
i = 1 or 2, and generally 2;
D is selected from the group consisting of:

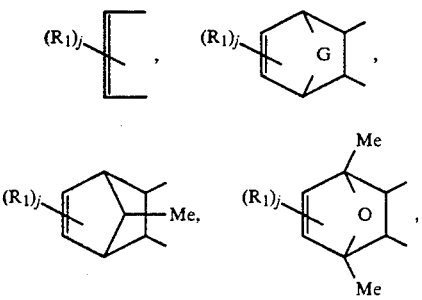

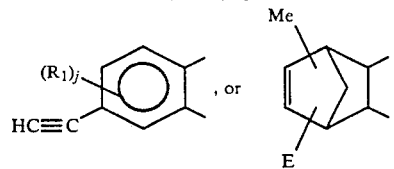

$R_1$ is lower alkyl, aryl, substituted alkyl, substituted aryl, lower alkoxy, aryloxy, or mixtures thereof (preferably lower alkyl of less than 4 carbon atoms);
G is —SO$_2$—, —S—, —CH$_2$—, or —O— (preferably —CH$_2$—);
j = 0, 1, or 2;
X is halogen (preferably chlorine);
R is an aromatic radical;
R' is an aromatic radical;
Me = methyl;
E = allyl or methallyl; and
n is selected so that the polymer has a molecular weight between about 1,000 and 40,000. The preferred molecular weight for oligomers is between about 5,000 and about 30,000, and more preferably between about 10,000 and 20,000.

Preferably, R is selected from the group consisting of:

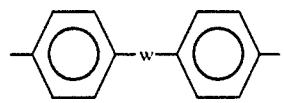

wherein w = —SO$_2$—, —S—, or —(CF$_3$)$_2$C—. R' is preferably selected from the group consisting of: phenyl, biphenyl, or

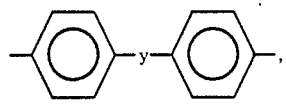

wherein y = —(CH$_3$)$_2$C—, —S—, —O—, —SO$_2$—, and —(CF$_3$)$_2$C—.

Substituent groups selected from the group consisting of halogen, alkyl groups having 1 to 4 carbon atoms, alkoxy groups having 1 to 4 carbon atoms, aryl, or substituted aryl may depend from the aryl groups of the oligomer backbone. While para isomerization is shown, other isomers may be used. Substituent groups present steric hindrance problems, and, therefore, unsubstituted aryl groups are preferred.

The oligomers are generally made by (a) mixing the reactants with K$_2$CO$_3$ or another suitable buffer or "scavenger" in a suitable solvent in the presence of an inert atmosphere, and (b) heating the mixture, if necessary, to react the compounds.

The imidophenol reactants are prepared by reacting a suitable anhydride with diaminophenol in a solvent in the presence of an inert atmosphere.

Prepregs can be prepared from the oligomers, and composites from the prepregs or oligomers. Blends comprise the crosslinking oligomers and compatible polymers. The polymer generally has a substantially identical backbone as the oligomer (i.e., is a similar polyethersulfone) but is not capable of crosslinking. The blends provide improved physical properties having greater strength and toughness while retaining adequate solvent resistance.

Curing times are reduced, solvent resistance is improved (with a decrease in thermoplasticity), and lower temperatures can be used during the curing step by forming prepregs containing (1) the oligomers or blends and (2) a suitable coreactant containing comparable crosslinking functionalities to those on the oligomer.

BEST MODE CONTEMPLATED FOR CARRYING OUT THE INVENTION

The difunctional imidophenol end-cap monomers are the condensation products of aminophenols and anhydrides. Polymers using these monomers are prepared in solvent polymerization by reacting dialcohols (i.e., diols or bisphenols), dihalogens, and the monomers. Average formula weights of the oligomers are controlled by controlling the concentrations combinations of the three components.

Thus, crosslinkable oligomers with two crosslinking sites at each end are formed by reacting:
1) 2 moles A—OH,
2) n+1 moles X—R—X, and
3) n moles HO—R'—OH,
wherein A is

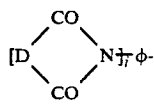

wherein D is selected from the group consisting of:

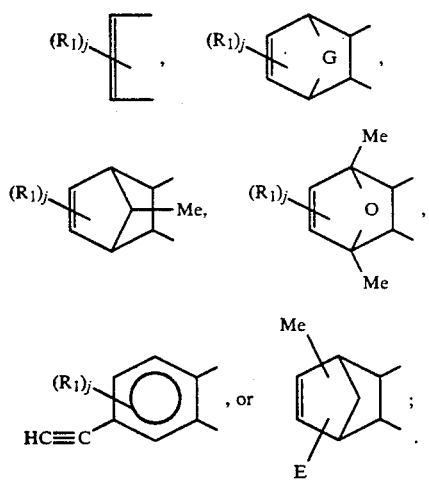

$R_1$ is lower alkyl, aryl, substituted alkyl, substituted aryl, lower alkoxy, aryloxy, or mixtures thereof (preferably lower alkyl of less than 4 carbon atoms);
$G = -SO_2-$, $-S-$, $-CH_2-$, or $-O-$ (preferably $-CH_2-$);
j = 0, 1, or 2;
X is halogen (preferably chlorine);
R is an aromatic radical;
R' is an aromatic radical;
Me = methyl;
E = allyl or methallyl; and
ø = phenyl;
i = 2; and n is selected so that the polymer has a molecular weight between about 1,000 and 40,000.

The resulting product has the polyether structure:

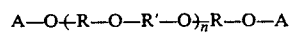

This reaction is generally carried out by mixing all three compounds with NaOH, KOH, $K_2CO_3$, $Na_2CO_3$, $NaHCO_3$, $KHCO_3$, or mixtures thereof in a suitable solvent in the presence of an inert atmosphere and heating the mixture, as necessary, to react the compounds. The reaction mixture accordingly is basic to avoid undesired side reactions. $K_2CO_3$ is the preferred "scavenger".

The average formula weight of the resulting oligomers ranges between 1,000 and 40,000; preferably between about 5,000 and 30,000; and, more preferably, between about 10,000 and 20,000. Within these ranges, the oligomers can be crosslinked in a curing step, such as vacuum bagging, to form thermoplastic polymers that are solvent resistant. Since uncured oligomers are relatively soluble in conventional prepregging solvents, they can be easily processed into prepregs.

An oligomer having an average formula weight below about 1,000 undergoes excessive crosslinking and loses its thermoplastic properties (the oligomer is thermosetting). An oligomer having an average formula weight above about 40,000, on the other hand, has insufficient crosslinking and has inadequate solvent resistance.

The difunctional imidophenol end-cap monomers of the present invention usually are pure compounds, but mixtures of monomers having similar cure activation temperatures may also be used to form oligomers having two or more end-cap types.

The dialcohol is generally a polyaryl compound and preferably is selected from the group consisting of:
HO—Ar—OH;
HO—Ar—L—Ar'—L—Ar—OH;
HO—Ar'—L—Ar—L—Ar'—OH;
wherein $L = -CH_2-$, $-(CH_3)_2C-$, $-(CH_3)_2C-$, $-O-$, $-S-$, $-SO_2-$ or $-CO-$;

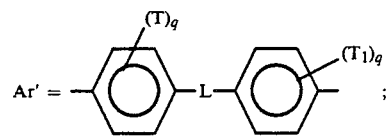

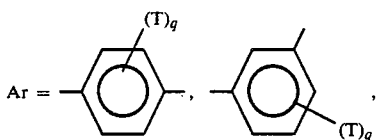

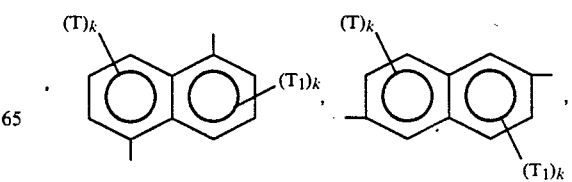

-continued

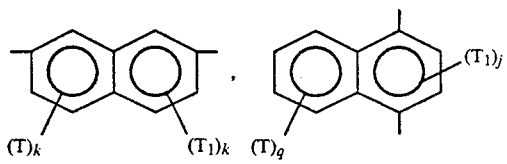

T and $T_1$ = lower alkyl, lower alkoxy, aryl, aryloxy, substituted aryl, or mixtures thereof;
$q = 0-4$;
$k = 0-3$; and
$j = 0, 1,$ or $2$;

hydroquinone;
bisphenol A;
p, p'-biphenol
4, 4'-dihydroxydiphenylsulfide;
4, 4'-dihydroxydiphenylether;
4, 4'-dihydroxydiphenylisopropane;
4, 4'-dihydroxydiphenylhexafluoropropane;
a dialcohol having a Schiff base segment, the radical being selected from the group consisting of:

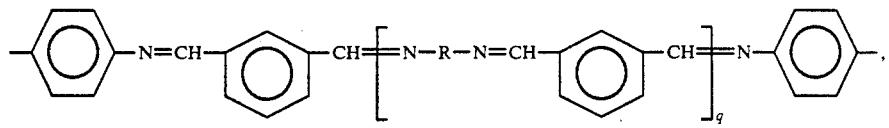

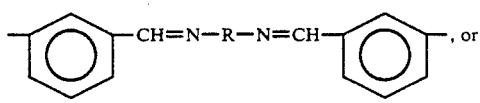

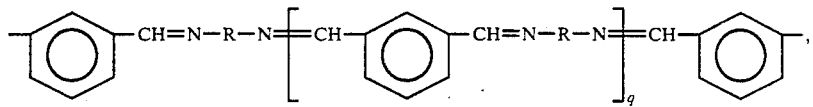

wherein R is selected from the group consisting of:
phenyl;
biphenyl;
naphthyl; or
a radical of the general formula:

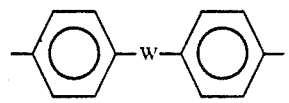

wherein $W = -CH_2-$ or $-SO_2-$; or a dialcohol selected from the group:

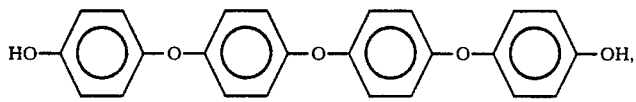

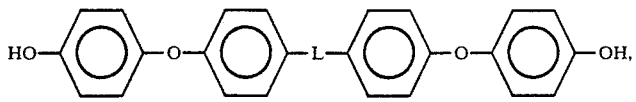

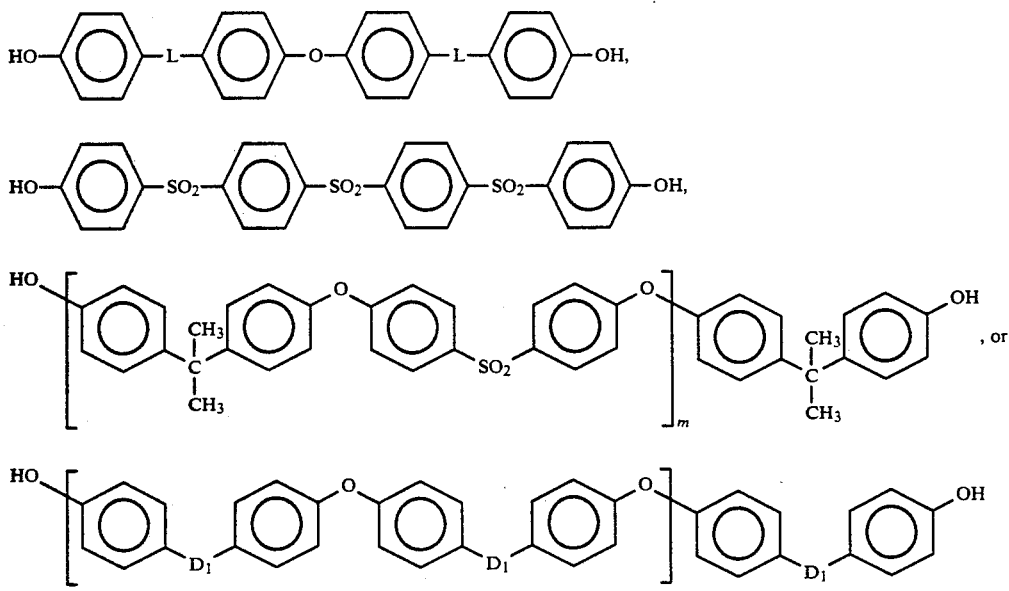

wherein L is as defined above;
Me=CH₃—;
m=an integer, generally less than 5, and preferably 0 or 1; and
$D_1$=any of —CO—, —SO₂—, or —(CF₃)₂C—.

While bisphenol A is preferred (because of cost and availability), the other dialcohols can be used to add rigidity to the oligomer without significantly increasing the average formula weight, and, therefore, can increase the solvent resistance. Random or a block copolymers are possible.

Furthermore, the dialcohols may be selected from the dihydric phenol imide sulfone resins described in U.S. Pat. No. 4,584,364, which is incorporated by reference, or those dihydric phenols described in U.S. Pat. Nos. 3,262,914 or 4,611,048. Other suitable dialcohols are described in our copending applications 016,703 and 726,258; or in U.S. Pat. Nos. 4,584,364; 4,661,604; 3,262,914; or 4,611,048.

The bisphenol may be in phenate form, or a corresponding sulfhydryl can be used. Of course, mixtures of bisphenols and disulfhydryls can be used.

Dialcohols of the type described are commercially available. Some may be easily synthesized by reacting dihalogen intermediate with bis-phenates, such as the reaction of 4,4'-dichlorophenylsulfone with bis(-disodium biphenolate). Preferred dihalogens in this circumstance are selected from the group consisting of:

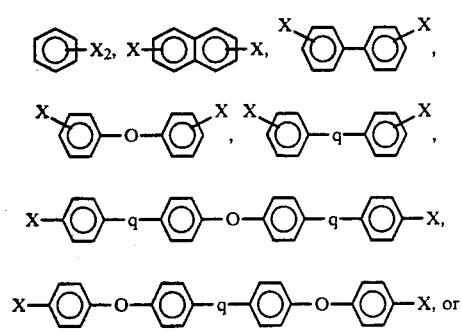

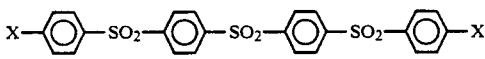

-continued

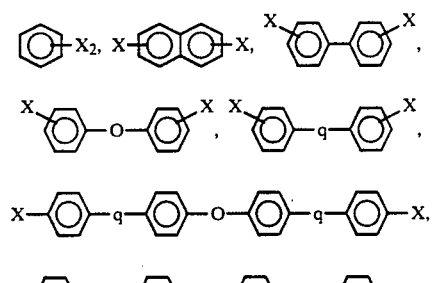

wherein X=halogen, preferably chlorine; and
q=—S—, —SO₂—, —CO—, —(CH₃)₂C—, and —(CF₃)₂C—, and preferably either —SO₂— or —CO—.

Preferred dihalogens for the ethersulfone condensation include 4,4'-dichlorodiphenylsulfone, 4,4'-dichlorodiphenylthioether, 4,4'-dichlorodiphenylhexafluoropropane, or mixtures thereof although the dihalogen can be selected from the group consisting of:

Crosslinking occurs upon heating the oligomers to about 450° F. to 700° F., with the preferred range being 500° F. to 650° F. Lower curing temperatures may be used if coreactants are added to the oligomers. The coreactants also accelerate the curing reaction, increase solvent resistance, and decrease the thermoplasticity of the resin.

For oligomers having maleic end-caps, A suitable coreactant is selected from the group consisting of p-phenylenediamine, benzidine, 4,4'-methylenedianiline, and simple diamines of the formula: H₂N—R—NH₂ wherein R is an alkyl having 2 to 6 carbon atoms, or mixtures thereof.

For oligomers containing the norbornene group, a suitable coreactant is:

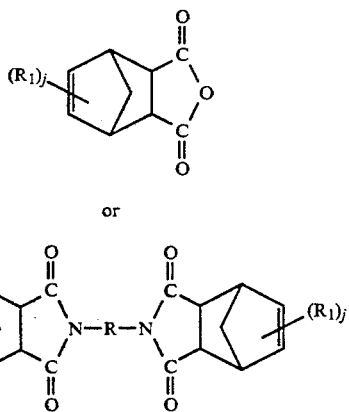

or

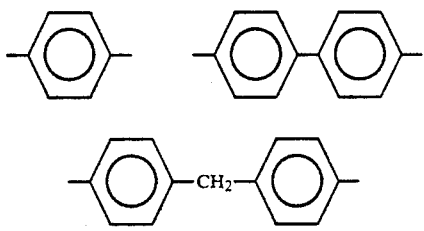

wherein R is an alkyl having 2 to 6 carbon atoms or an aromatic radical such as:

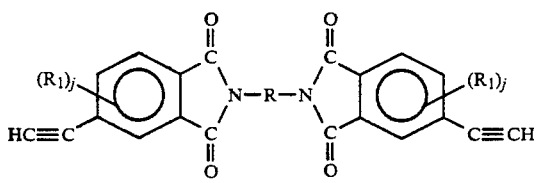

and $R_1$ and j are as previously defined.

Suitable coreactants for oligomers containing the acetylene group include:

wherein R, $R_1$ & j are as previously defined.

Blends can improve impact resistance of composites without causing a significant loss of solvent resistance. The blends comprise mixtures of one or more crosslinkable oligomer and one or more polymer that is incapable of crosslinking. Generally, the blends comprise substantially equimolar amounts of one polymer and one oligomer having substantially identical backbones. The crosslinkable oligomer and compatible polymer can be blended together by mixing mutually soluble solutions of each. While the blend is preferably equimolar in the oligomer and polymer, the ratio of the oligomer and polymer can be adjusted to achieve the desired physical properties.

Although the polymer in such a blend usually has the same length backbone as the oligomer, the properties of the composite formed from the blend can be adjusted by altering the ratio of formula weights for the polymer and oligomer. The oligomer and polymer generally have substantially identical repeating units, but the oligomer and polymer merely need be compatible in the solution prior to sweeping out as a prepreg. Of course, if the polymer and oligomer have identical backbones, compatibility in the blend is likely to occur. Blends that comprise relatively long polymers and relatively short oligomers (i.e., polymers having higher average formula weights than the oligomers) prior to curing are preferred, since, upon curing, the oligomers will effectively increase in MW by crosslinking.

In synthesizing the comparable polymers, quenching end caps can be employed, if desired, to regulate the polymerization of the comparable polymer, so that it has an average formula weight substantially identical with the crosslinkable oligomer. For thermal stability, an aromatic compound, such as phenol or nitrobenzene, is preferred to quench the synthesis.

Solvent resistance may decrease markedly if the comparable polymer is provided in large excess to the crosslinkable oligomer in the blend.

The blends will generally comprise a mixture of a polyethersulfone oligomer and the same ethersulfone polymer. The polymer may, however, be a different polymer. The mixture may include several types of oligomers or several types of polymers, such as a three component mixture of ethersulfone oligomer, a ether oligomer, and an ether or ether polymer.

The blends may be semi-interpenetrating networks of the general type described by Egli et al, "Semi-Interpenetrating Networks of LARC-TPI" available from NASA-Langley Research Center.

The polyethersulfones of the present invention can also be prepared by reacting the dialcohols with suitable dinitro compounds, insofar as the phenolic —OH will react with a nitro functionality to form an ether linkage. Of course, the —OH may be in phenate form.

Prepregs of the oligomers or blends can be prepared by conventional techniques. While woven fabrics are the typical reinforcement, the fibers can be continuous or discontinuous (in chopped or whisker form) and may be ceramic, organic, carbon (graphite), or glass, as suited for the desired application.

Composites can be formed by curing the oligomers or prepregs in conventional vacuum bag techniques. The oligomers can also be used as adhesives, varnishes, films, or coatings.

Multidimensional oligomers can be prepared using an aromatic hub that includes three or more reactive —OH, —X, or —$NO_2$, groups (such as phloroglucinol) with suitable dialcohols, dihalogens, and nitro or imidophenol end-cap monomers. For example, phloroglucinol can be mixed with bisphenol A, dichlorobenzene, and 1-hydroxyphenyl-2,4-dinadimide to form a multidimensional polyether oligomer. Those skilled in the art will understand the generality of this example with respect to the formation of corresponding multidimensional polyethersulfone oligomers. Multidimensional polymers can be prepared by replacing the crosslinking end cap monomer with a quenching compound like phenol, chlorobenzene, or nitrobenzene.

Blends of the multidimensional oligomers and compatible polymers can also be made.

To avoid competing reactions, the multidimensional oligomers can be formed in a stepwise reaction scheme, such as combining the hub with the dihalogen, adding the dialcohol, adding more dihalogen, and completing the reaction by adding the imidophenol end-cap monomer.

The following examples are presented to illustrate various features of the invention:

EXAMPLE 1

Synthesis of 1-hydroxyphenyl-2,4-dinadimide

Under dry N$_2$, a slurry of 19.71 g (0.1 moles) of purified 2,4-diaminophenol dihydrochloride was prepared containing 10 percent solids in 17.39 g of N,N-dimethylacetamide (DMAC). 16.80 g (0.2 moles) dry NaHCO$_3$ was added. After foaming subsided, 65.61 g xylene and 32.83 g (0.2 moles) 5-norbornene 2,3-dicarboxylic anhydride were slowly added. Transferred to a Barrett trap filled with xylene, the reaction mixture was refluxed (150° C.) until no more water was collected in the Barrett trap. The product was precipated in water, separated by filtration, and washed.

EXAMPLE 2

Synthesis of 1-hydroxyphenyl-3,5-dinadimide

The process of Example 1 was repeated except that 0.1 moles of 3,5-diaminophenol dihydrochloride was substituted for 2,4-diaminophenol dihydrochloride.

EXAMPLE 3

Synthesis of 1-hydroxyphenyl-2,4-dinadic (cap 10% excess, 20% excess K$_2$CO$_3$, Formula weight 20,000)

In a 1000-ml resin kettle fitted with a mechanical stirrer, thermometer, condenser, Dean Stark trap, and dry N$_2$ purge, add 405.8 grams of dimethylacetamide was added to 173.9 grams toluene, 5.70 grams (0.014 mole) of 1-hydroxyphenyl-2,4-dinadimide (the compound of Example 1), 98.35 grams (0.273 mole) of 4-chlorophenylsulfone, 60.87 grams (0.267 mole) bisphenol A, and 45.25 grams potassium carbonate. Heated to 140° C., the mixture was refluxed for 72 hours, before raising the temperature to 160°-165° C. to distill off the toluene. Refluxing at 160°-165° C. continued for 1 hour after all toluene was collected. The product was recovered thereafter by conventional steps.

EXAMPLE 4

Synthesis of 1-hydroxyphenyl-3,5-dinadimide (cap 10% excess, 20% excess K$_2$CO$_3$, Formula weight 20,000)

Using the procedure of Example 3, but substituting 1-hydroxyphenyl-3,5-dinadimide (the compound of Example 2) for 1-hydroxyphenyl-2,4-dinadimide yielded the desired product.

EXAMPLE 5

Preparation of composites

The oligomer obtained from either Example 3 or 4 was impregnated on epoxy-sized T300/graphite fabric style (Union Carbide 35 million modulus fiber 24×24 weave) by sweeping a 10 to 15% resin solids solution of the oligomer in methylene chloride into the fabric, taking care to wet the fibers as well as possible. The oligomer comprised about 38 wt. % of the resulting prepreg. After drying to less than 1 percent volatile content, the prepreg was cut into 6×6-inch pieces and stacked to form a laminated composite of approximately 0.080 inch upon curing in a conventional vacuum bag process under 100 psi in an autoclave at 625° F. for at least 6 hours. The composite exhibited substantial resistance to conventional solvents, such as MEK and methylene chloride.

While preferred embodiments have been described, those skilled in the art will readily recognize alterations, variations, or modifications that might be made to the embodiments without departing from the inventive concept. The description and examples, accordingly, are intended to illustrate the invention. The claims should be construed liberally in view of the description, and should only be limited as is necessary in view of the pertinent prior art.

We claim:

1. A blended oligomer, comprising a crosslinking oligomer formed by the condensation of:
   (a) 2 moles of a crosslinkable imidophenol having at least two crosslinking functionalities;
   (b) n+1 moles of an aromatic dihalogen, and
   (c) n moles of an aromatic bisphenol and a compatible polymer, wherein the imidophenol has the formula Y$_i$—∅—OH i = 1 of 2;

Y =

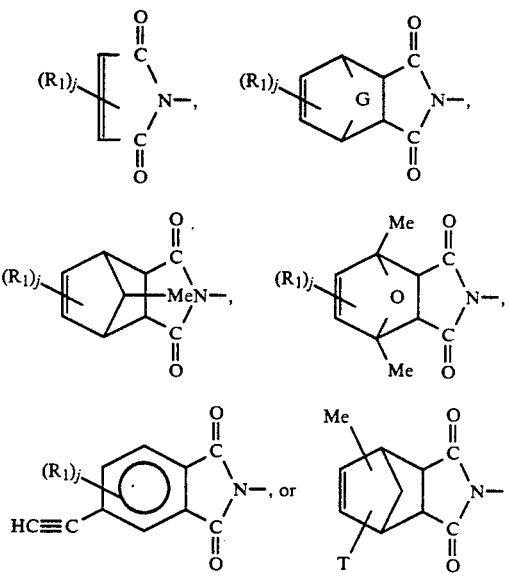

R$_1$ = lower alkyl, aryl, substituted alkyl, substituted aryl, lower alkoxy, aryloxy, or mixtures thereof;

G = —SO$_2$—, —S—, —CH$_2$—, or —O—;

j = 0, 1, or 2;

n = an integer such that the oligomer has an average formula weight of between about 1,000 to about 40,000;

Me = methyl;

T = allyl or methallyl; and

∅ = phenyl.

2. The blended oligomer of claim 1 wherein the polymer is a polyethersulfone.

3. The blended oligomer of claim 1 wherein having substantially equimolar proportions of the oligomer and polymer.

4. The blended oligomer of claim 1 further comprising a suitable coreactant.

5. A prepreg comprising the blended oligomer of claim 1 and a reinforcing additive in fiber or particulate form.

6. A composite formed by curing the prepreg of claim 5.

7. A prepreg comprising the blended oligomer of claim 4 and a reinforcing additive on fiber or particulate form.

8. A multidimensional polyethersulfone oligomer prepared by reacting an aromatic hub having at least three reactive —OH functionalities with a dihalogen selected from the group consisting of:

X—∅—q—∅—X,
X—∅—O—∅—q—∅—O—∅—X,
X—∅—q—∅—∅—∅—q—∅—X, or
X—∅—SO₂—∅—SO₂—∅—SO₂—∅—X and an imidophenol end-cap monomer of the general formula Y$_i$—∅—OH wherein Y=

Y=

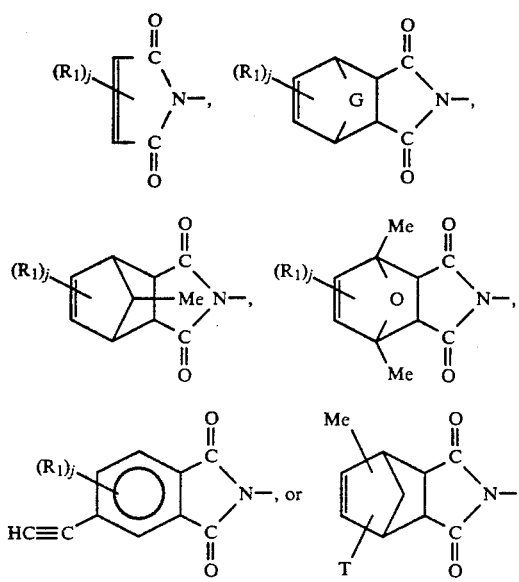

R₁ = lower alkyl, aryl, substituted alkyl, substituted aryl, lower alkoxy, aryloxy, or mixtures thereof;
G = —SO₂—, —S—, —CH₂—, or —O—;
j = 0, 1 or 2;
R = an aromatic radical;
R' = an aromatic radical;
n = an integer such that the oligomer has an average formula weight of between about 1,000 to about 40,000;
i = 1 or 2;
Me = methyl;
T = allyl or methallyl;
X = halogen;
∅ = phenyl; and
q = —S—, —SO₂—, —CO—, —(CH₃)₂C—, or —(CF₃)₂C—.

9. The oligomer of claim 8 further comprising the residue of a dialcohol between residues of dihalogen.

10. A blend comprising the oligomer of claim 8 and a compatible, noncrosslinking polymer.

11. A prepreg comprising the oligomer of claim 8 and a reinforcing additive in fiber or particulate form.

12. A composite comprising the cured prepreg of claim 11.

13. A prepreg comprising the blend of claim 10 and a reinforcing additive in fiber or particulate form.

14. A blend comprising the oligomer of claim 8 and a suitable coreactant.

15. A method for making a polyethersulfone multidimensional oligomer comprising the step of condensing an aromatic polyol hub molecule of the general formula Ar(OH)$_w$ wherein Ar = an aromatic radical and w = an integer greater than or equal to 3 with a dihalogen, a bisphenol, and a crosslinking imidophenol in a suitable solvent under an inert atmosphere.

16. A method for making a polyethersulfone multidimensional oligomer comprising the step of condensing an aromatic polyhalide of the general formula Ar(X)$_w$ wherein Ar = an aromatic radical, X = halogen, and w = an integer greater than or equal to 3 with a bisphenol, a dihalogen, and a crosslinking imidophenol in a suitable solvent under an inert atmosphere.

* * * * *